(12) United States Patent
San Clemente

(10) Patent No.: US 9,778,707 B1
(45) Date of Patent: Oct. 3, 2017

(54) SYSTEM FOR FIELD ACCESS OF DATA

(71) Applicant: Performance Contracting, Inc., Lenexa, KS (US)

(72) Inventor: Thomas M. San Clemente, Roseville, CA (US)

(73) Assignee: Performance Contracting, Inc., Lenexa, KS (US)

( * ) Notice: Subject to any disclaimer, the term of this patent is extended or adjusted under 35 U.S.C. 154(b) by 37 days.

(21) Appl. No.: 14/817,566

(22) Filed: Aug. 4, 2015

Related U.S. Application Data

(60) Provisional application No. 62/035,160, filed on Aug. 8, 2014.

(51) Int. Cl.
*G06F 1/16* (2006.01)
*G06F 1/18* (2006.01)

(52) U.S. Cl.
CPC ............ *G06F 1/182* (2013.01); *G06F 1/1607* (2013.01)

(58) Field of Classification Search
CPC ......... B62B 3/002; B62B 3/004; B62B 3/005; B62B 2202/56; G06F 1/1613; G06F 1/1628; G06F 1/163; G06F 1/1633; G06F 1/182; G06F 1/1607
USPC ......... 361/679.02, 679.33–679.39, 724–727, 361/752; 312/223.1–223.2
See application file for complete search history.

(56) References Cited

U.S. PATENT DOCUMENTS

| | | | |
|---|---|---|---|
| 6,442,030 B1 * | 8/2002 | Mammoser | G06F 1/1601 248/917 |
| 6,554,697 B1 * | 4/2003 | Koplin | G06F 1/18 361/690 |
| 7,114,733 B2 | 10/2006 | Downs | |
| 8,162,330 B2 | 4/2012 | Melkumyan et al. | |
| 8,474,834 B2 | 7/2013 | Abel et al. | |
| 8,662,605 B2 | 3/2014 | McRorie et al. | |
| 8,857,828 B1 * | 10/2014 | San Clemente | B62B 5/0013 248/918 |
| 2007/0029746 A1 | 2/2007 | Brennan, Jr. | |
| 2007/0228680 A1 | 10/2007 | Reppert et al. | |
| 2008/0312491 A1 | 12/2008 | Smith et al. | |

OTHER PUBLICATIONS

Knaack LLC brochure "Field Stations—Model 119-01 Field Station" 2 pages Apr. 22, 2012.

(Continued)

*Primary Examiner* — Anthony Haughton
*Assistant Examiner* — Ingrid Wright
(74) *Attorney, Agent, or Firm* — Louis Isaf; Womble Carlyle Sandridge & Rice

(57) ABSTRACT

A system for displaying electronic construction documents includes an enclosure having doors extending across an open side to define an interior volume that is sealable against infusion of dust and water, and a monitor panel extending across the width of the interior volume to define a back chamber between the monitor panel and a back panel of the enclosure. The system includes a purge air system in fluid communication with the back chamber and that is operable, when door are open, to draw in and filter air from outside the enclosure and establish a positive air pressure within the back chamber. The monitor panel includes a perimeter frame with a center aperture and a transparent pane extending across the center aperture for viewing an electronic display therethrough, and is angularly adjustable between a plurality of angled upright positions while maintaining the positive pressure within the back chamber.

21 Claims, 12 Drawing Sheets

(56) References Cited

OTHER PUBLICATIONS

BIM Kiosk, www.BIMKiosk.com, 2 page brochure—prior to Jul. 10, 2012.
Rolling cabinet distributed by Knaack LLC—prior to Jul. 10, 2012.
Mobile Security Computer Cabinet With Rear Access Door & Slid-out Shelf brochure—globalindistrial.com (pp. 317-318)—prior to Jul. 10, 2012.

* cited by examiner

SYSTEM FOR FIELD ACCESS OF DATA

CROSS-REFERENCE TO RELATED APPLICATIONS

This application claims the benefit of U.S. Provisional Patent Application No. 62/035,160, filed on 8 Aug. 2014, which application is incorporated by reference in its entirety herein and for all purposes.

FIELD OF THE INVENTION

The present invention relates generally to field access systems or stations for accessing electronic data in unprotected locations that are exposed to the elements, and in particular to portable or movable field access stations that are configured to secure and protect their contents from the elements at construction work sites and other high-dust environments.

BACKGROUND

As with many highly-competitive industries, the construction industry is seeking to continuously improve its business practices. This is particularly pertinent as relating to the storage, access and display of construction documents in electronic format, especially large-format construction drawings. The capability of comfortably and easily reviewing, creating, editing and updating blueprints and other electronic documents in a field location holds the promise of substantial cost savings by both reducing the turn-around time for sharing information and by eliminating the costs of printing and maintaining multiple hardcopies.

Unfortunately, bringing the digital age to a construction worksite has been problematic at best, as moisture from rain or snow, dust from blown insulation, paint aerosols, dry dirt and the like eventually finds its way into electronic equipment and its associated components to cause damage and pre-mature failure. In addition, electronic television monitors having large screens for viewing drawings and data in a large, construction-sized format are simultaneously the most expensive and the most susceptible to damage, especially during the type of everyday use at a construction site where this equipment has the potential to provide the greatest utility.

The present disclosure seeks to overcome the problems presented in the prior art by providing a movable or mobile field access station for large-format television monitors and other electronic devices such as computers, printers, uninterruptable power supplies (UPS), wireless modems or routers, and the like, and which also provides a convenient viewing and work station, protects the electronic equipment from moisture, chemicals and airborne particulate matter during normal daily use, and that provides an extra layer of protection and security during after-hours storage.

SUMMARY

Briefly described, one embodiment of the present disclosure comprises a system for displaying electronic construction documents in a high-dust industrial environment that includes an enclosure having door panels extending across an open side to define an interior volume that is substantially sealable against infusion of dust and water, and a monitor panel extending across the width of the interior volume to define a pressurizable back chamber between the monitor panel and the back panel of the enclosure. The system also includes a purge air system in fluid communication with the back chamber and that is operable, when door panels are open, to draw in and filter air from outside the enclosure and establish a positive air pressure within the back chamber. The monitor panel of the system further includes a perimeter frame with a center aperture and a transparent pane extending across the center aperture for viewing an electronic display therethrough. The monitor panel is also angularly adjustable between a plurality of angled upright positions to avoid glare on the transparent pane and provide a comfortable view angle for a user while maintaining the positive pressure within the back chamber.

BRIEF DESCRIPTION OF THE DRAWINGS

These and various other advantages, features, and aspects of the present invention will become apparent and more readily appreciated from the following detailed description of the embodiments taken in conjunction with the accompanying drawings, as follows.

Figure 1:
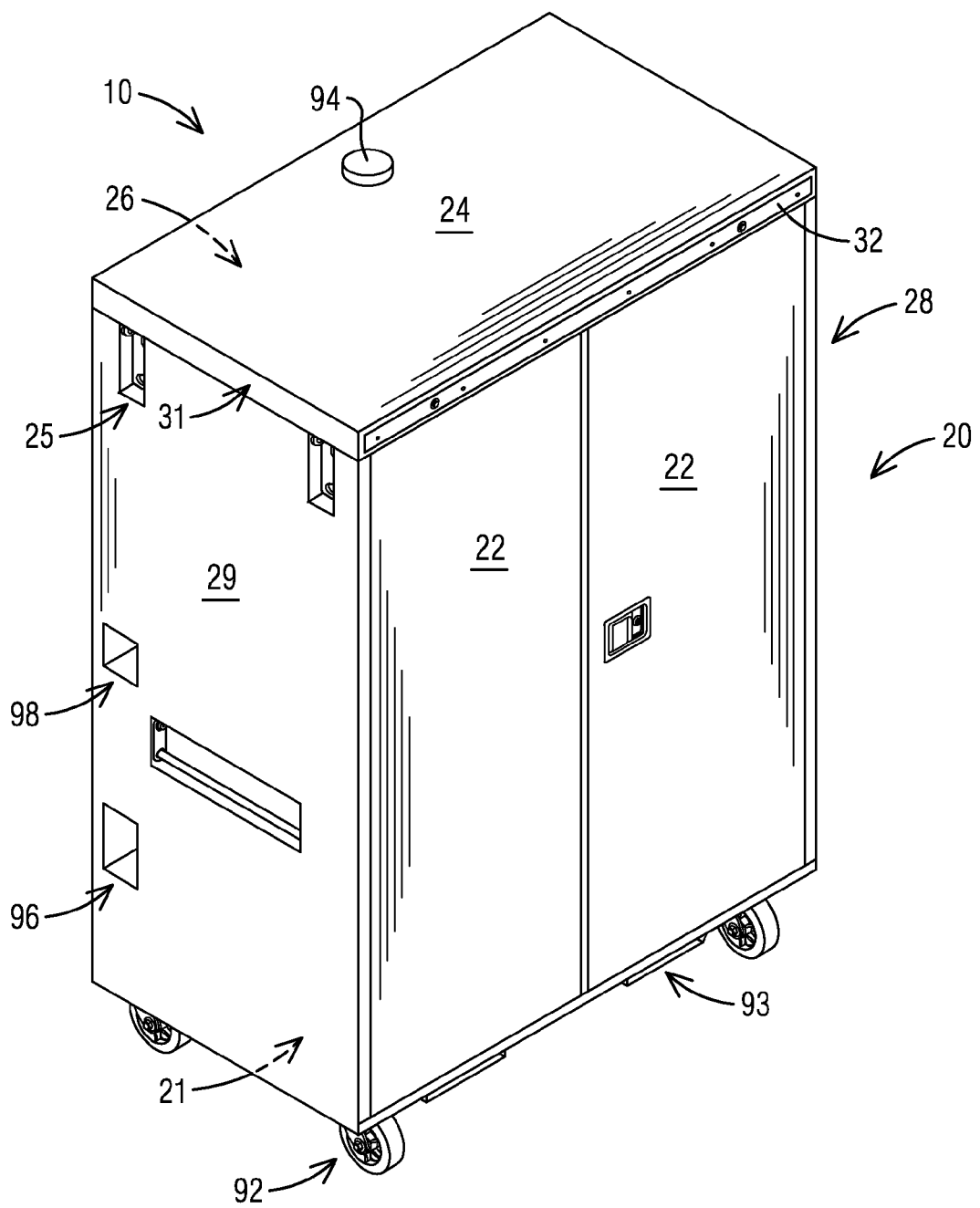
FIG. 1 is a perspective view of a movable field access station in a closed and sealed configuration, in accordance with a representative embodiment of the disclosure.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following description is provided as an enabling teaching of exemplary embodiments of a field access station. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. In other words, features from one embodiment or aspect may be combined with features from any other embodiment or aspect in any appropriate combination. For example, any individual or collective features of method aspects or embodiments may be applied to apparatus, product or component aspects or embodiments and vice versa. Accordingly, those who work in the art will recognize that many modifications and adaptations to the embodiments described are possible and may even be desirable in certain circumstances, and are a part of the invention. Thus, the following description is provided as an illustration of the principles of the embodiments and not in limitation thereof, since the scope of the invention is to be defined by the claims.

Illustrated in FIGS. 1-19 are representative embodiments of a movable field access station for housing and protecting electronic equipment when situated in environments that are high in airborne dust or particulate matter, or that may be at least partially exposed to the elements such as wind, rain, sleet, mist and snow. Such surroundings are often found at exposed construction sites, outdoor work sites, and at certain manufacturing facilities where moisture from rain or snow, dust from spray-applied fire resistant material (SFRM), blown insulation, paint aerosols, dry dirt and the like, can find its way into the electronic equipment and the associated components to cause pre-mature failure. The movable field access station is configured to provide this protection during both normal in-use time as well as after-hours storage. As described below, the field access station of the present disclosure provides several significant advantages and benefits over other devices and methods for housing and protecting electronic equipment. However, the recited advantages are not meant to be limiting in any way, as one skilled in the art will appreciate that other advantages may also be realized upon practicing the present invention.

Referring first to FIGS. 1-6, the field access station 10 generally includes an outer enclosure 20 having a back panel 26, a right-hand side panel 28, and a left-hand side panel 29, a bottom panel 21, and a top panel 23 mounted to the tops of the vertical panels to define an interior volume that is closed by one or more movable front door panels 22. For example, the door panels 22 can be pivotably secured to the side panels 28, 29 with continuous hinges. In addition, the top panel 23 of the enclosure 20 can also serve as the bottom panel of an awning box 31 that is covered by a roof cap 24 to define an awning compartment. Each of the fixed panels can be connected along their edges to adjacent panels with a continuous sealed joint, so that together the plurality of joined panels form a rigid and robust sealed enclosure 20 that surrounds the interior volume and is substantially sealable against the infusion of dust and water.

In addition, in some embodiments the panels that form the enclosure 20 can be made from a heavy-gauge metal material, such as from carbon steel, a steel alloy, or aluminum and the like, which can provide protection from all but the most serious of accidents or attacks. In this case the continuous sealed joint that connects adjacent panels can preferably be a weld, although other types of sealed joints, such as with an epoxy or adhesive or mechanically bolted together can caulked or covered with an elongate corner bracket, and the like, are also possible and considered to fall within the scope of the present disclosure. Alternatively, the panels may be made from a polymer or composite material, such as carbon fiber, which may be selected both for its structural integrity and resistance to the elements as well as its density and weight that is significantly less than that of steel, resulting in a mobile access station that is easily moved about the work site. And in these embodiments the edges of adjacent panels can preferably be fused or epoxied together to form the continuous sealed joints. In yet other embodiments some of the panels can formed together as a singled molded frame or folded sheets of metal. Thus, when the front doors 22 are closed and locked, as shown in FIG. 1, the enclosure 20 can form a sealed and substantially weather-proof barrier that prevents the passage of moisture, airborne particulate matter, and most foreign objects into the interior compartments. For example, in one aspect the panels can be bulletproof to protect the contents from vandalism.

The interior volume of the enclosure 20 can be further divided into interior compartments that are each accessible through the front doors 22 or, in some embodiments, though other sealable openings. In one aspect the interior compartments can include an upper monitor compartment 40, a lower computer compartment 80, and a lower printer compartment 84 (see FIG. 3). The top panel 23 and/or roof cap 24 may have provision for a communication or GPS antennae 94 extending there through, but otherwise can be a continuous surface configured to provide protection from precipitation and falling objects. One of the side panels 28, 29 or the back panel 26 can also include an opening 96 for a retractable power cable and an opening 98 for a locking cable that are stored, when not extended, within smaller sub-housings installed within one of interior compartments.

The enclosure 20 of the movable field access station 10 generally includes locking and/or pivoting rollers 92 at each corner of the bottom panel 21, one or more side handles for moving and guiding the access station 10 about the job site or facility, and fork lift pockets 93 that facilitate the lifting and repositioning of the heavy enclosure 20 from both side with machinery that is typically available on a construction site. The enclosure 20 can also include a plurality of crane pick points or lifting lugs 95 that allow for the field access station 10 to be easily lifted between floors on a construction site. In one aspect of the disclosure shown in FIGS. 1-2, the lifting lugs 95 can be rotatably mounted within recessed pockets 25 formed into the side panels 28, 29 so that the lifting lugs 95 can be folded downward into the pockets 25 when not in use. The flush mounting of the lifting lugs can reduce the profile of the enclosure 20 and allow for the field access station 10 to be rolled through standard-sized doorways throughout the various stages of the construction project. In addition, the lifting lugs 95 can be magnetically secured in the upright position and/or in the stowed position.

The field access station 10 generally includes a purge air system that creates a positive pressure within closed and at least partially-sealed portions of the interior compartments to prevent dust and moisture from entering and coming into contact with the electronic equipment mounted therein, and to establish a steady outwardly-directed flow of purge air that forms a constant circulation within the closed compartments to cool the electronic equipment and components installed therein. For example, items of electronic equipment typically installed within the closed and pressurized compartments may include, but are not limited to, a display monitor 60 mounted behind the transparent window 58 of a rotatable monitor panel assembly 50 and a computer and/or uninterruptable power supply (UPS) stored within the computer compartment 80, as well as a Wi-Fi modem and/or router for broadcasting a wireless network throughout the construction site, a GPS receiver, a point-to-point wireless network bridge, and the like, installed within either of the above compartments.

In addition, the outward flow of purge air can also be directed to provide curtains of moving air that can substantially reduce the amount of dust and other contaminants that would tend to settle on any electronic equipment that is not located within the closed and pressurized portions of the interior compartments. These can include, but are not limited to, a printer or all-in-one scanner/printer/copier located with a printer compartment 84, as well as electronic devices (e.g. laptops, cell phones, tablet computers, keyboard, mouse) located on the mid-table 42 proximate the front surface of the monitor panel assembly 50 or within an extendable work drawer 88 mounted within the upper portion of the printer compartment 84.

Figure 3:
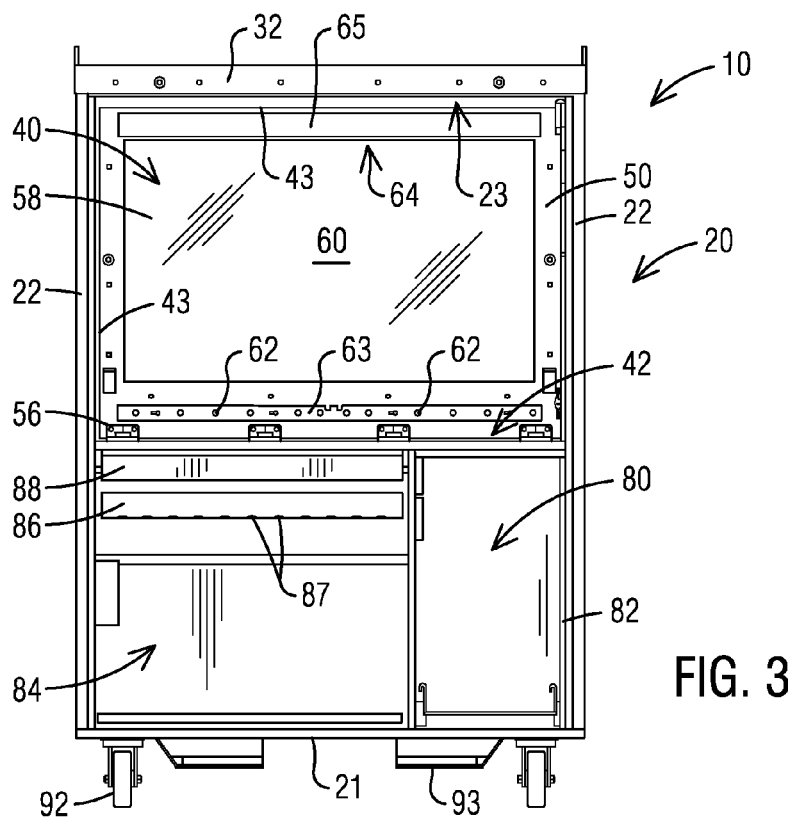
FIG. 3 is a front elevation view of the field access station of FIG. 1 in an open configuration.
Figure 4:
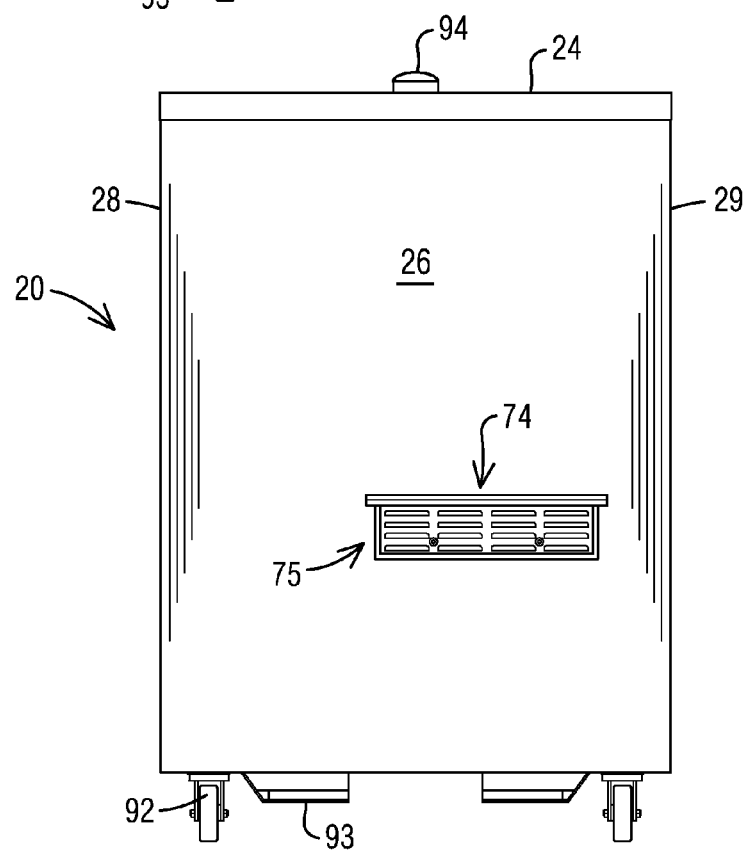
FIG. 4 is a back elevation view of the field access station of FIG. 1.

When the front doors 22 are open and the purge air system is operational (FIGS. 2-4), purge air can be drawn into the enclosure from an air intake vent 74 located in the back panel 26 of the enclosure 20 (FIG. 4). An air filter 75 can be installed at the air intake vent 74 to prevent airborne particulate matter and water droplets from entering the enclosure along with the purge air. The air filter 75 may be a fine particulate matter filter, an electrostatic air filter, or the like. The purge air can be forceably drawn into the enclosure 20 by a series of fans 76 mounted on the top of an intake plenum 72 located behind the monitor panel assembly 50 (FIG. 6), also known as the back chamber portion 70 of the upper monitor compartment 40. In one aspect the fans 76 can be sized to provide an air flow between about 100 CFM and about 300 CFM. As discussed in more detail below, the perimeter edges of the monitor panel assembly 50 can be configured to form a seal with the interior surfaces of the upper monitor compartment 40, which causes the back chamber portion 70 to become pressurized during operation of the purge air fans 76.

Also visible in FIG. 3, the monitor panel assembly 50 generally includes a plurality of lower vent holes 62 that can be slidably covered by air diffusor 63, as well as a plurality of upper vent hole 64 covered by air deflector 65. The lower vent holes 62 can be configured to direct the filtered and pressurized purge air exiting the back chamber portion 70 to pass over the top of any electronic components or devices supported on the mid-table 42 or within the extendable work drawer 88, thereby creating a curtain of moving air that substantially reduces or minimizes the amount of dust and other fine particulate matter that settles on the electronic devices. The upper vent holes 64 and air deflector 65 can be configured to direct pressurized purge air exiting the back chamber 70 to flow downwardly over the front surface of the transparent window 58, thereby creating another curtain of moving air that helps keep the window clean.

The lower computer compartment 80 may also be closed and at least partially sealed with a front door 82 and placed in fluid communication either with the intake plenum 72 or with the back chamber 70 of the upper monitor compartment 40, so that the computer compartment 80 also becomes pressurized with filtered purge air during operation of the purge air system. In one aspect a purge air tube 86 with vent holes 87 (FIG. 5) can extend across the upper portion of the printer compartment 84 to connect with the interior of the computer compartment 80, so that at least a portion of the purge air flows from the plenum 72, through the computer compartment 80, into the purge air tube 86, and out through the vent hole 87 to form an air curtain barrier that helps to protect the printer from dust and other airborne particulates.

Along with a computer, the lower computer compartment 80 can also house additional electronic components such as an Uninterruptable Power Supply (UPS). The UPS may include an Automatic Voltage Regulator (AVR) and surge protections that conditions the power to the electronic components to desired performance characteristics. The provision of a UPS/AVR can be especially useful in situation where the electrical power to the field access station 10 is easily interrupted or is prone to fluctuation and spikes which can cause damage to the sensitive electronic components, both of which are common occurrences at construction sites.

The enclosure 20 also generally includes an awning 30 that extends over the top of the open doors 22 to form a partially enclosed area that can shelter individuals using the field access station 10 from wind and noise, while also providing shading to reduce or eliminate glare on the display screens of the various electronic devices. The awning 30 can be mounted on telescoping slide channels with linear bearings for retraction into the enclosed awning compartment that can be defined, as noted above, by an awning box 31 located at the top of the enclosure 20 and covered by the roof cap 24.

Figure 2:
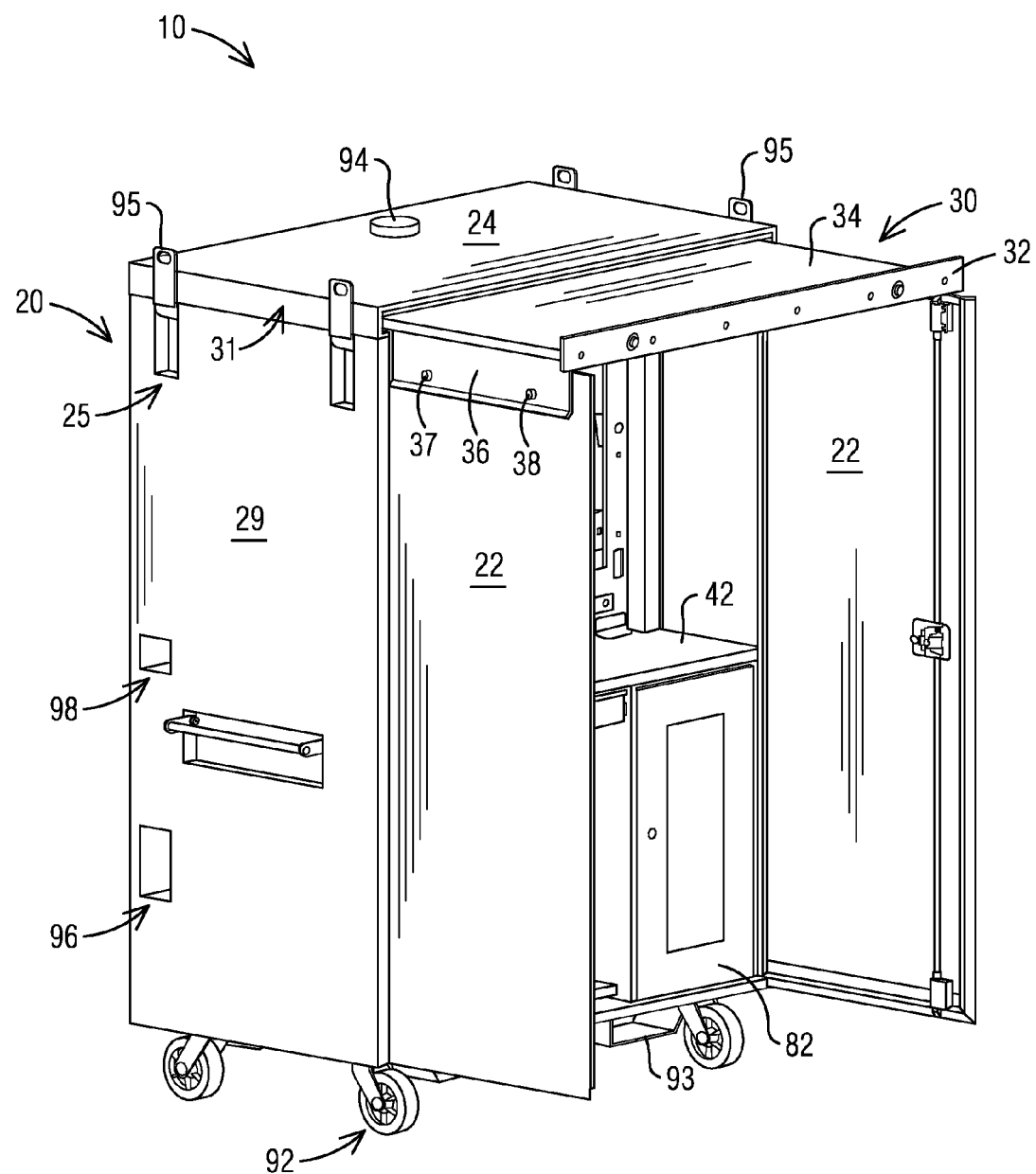
FIG. 2 is a perspective view of the field access station of FIG. 1 in an open configuration.

As shown in FIG. 2, the awning 30 can include an awning door or facia 32 mounted to the front edge of an awning tray 34, as well as catch flaps 36 that are pivotably mounted proximate the side edges of the awning tray 34, and that can rotate downward from their stowed positions when the awning 30 is fully withdrawn from the awning compartment. In one aspect the awning 30 can be extended outwardly from the enclosure 20 on the slide channels prior to fully opening the doors 22, so that the catch flaps 36 capture the top portions of the doors 22 to provide a substantially continuous joint or barrier along the upper edges of the open doors. The catch flaps 36 can also include one or more releasable fasteners 38 (such as magnets for metallic panels and clips or hook and loop-type fabric strips for non-metallic panels) that secure the catch flaps to the outer surfaces of the open doors 22 when the field access station 10 is in the open configuration (FIG. 2) and to the underside of the awning tray 34 when the field access station 10 is in the closed configuration (FIG. 1). The catch flaps 36 can also include drip edges 37 along their lower edges that redirect any water flowing down off the awning tray 34 away from the doors 22, as well as flexible sealing strips that seal any gaps between the catch flap 36, the door 22 and side panels 28, 29 of the enclosure 20 to further prevent any water from passing around the joint between the catch flap 36 and the door 22.

Figure 5:
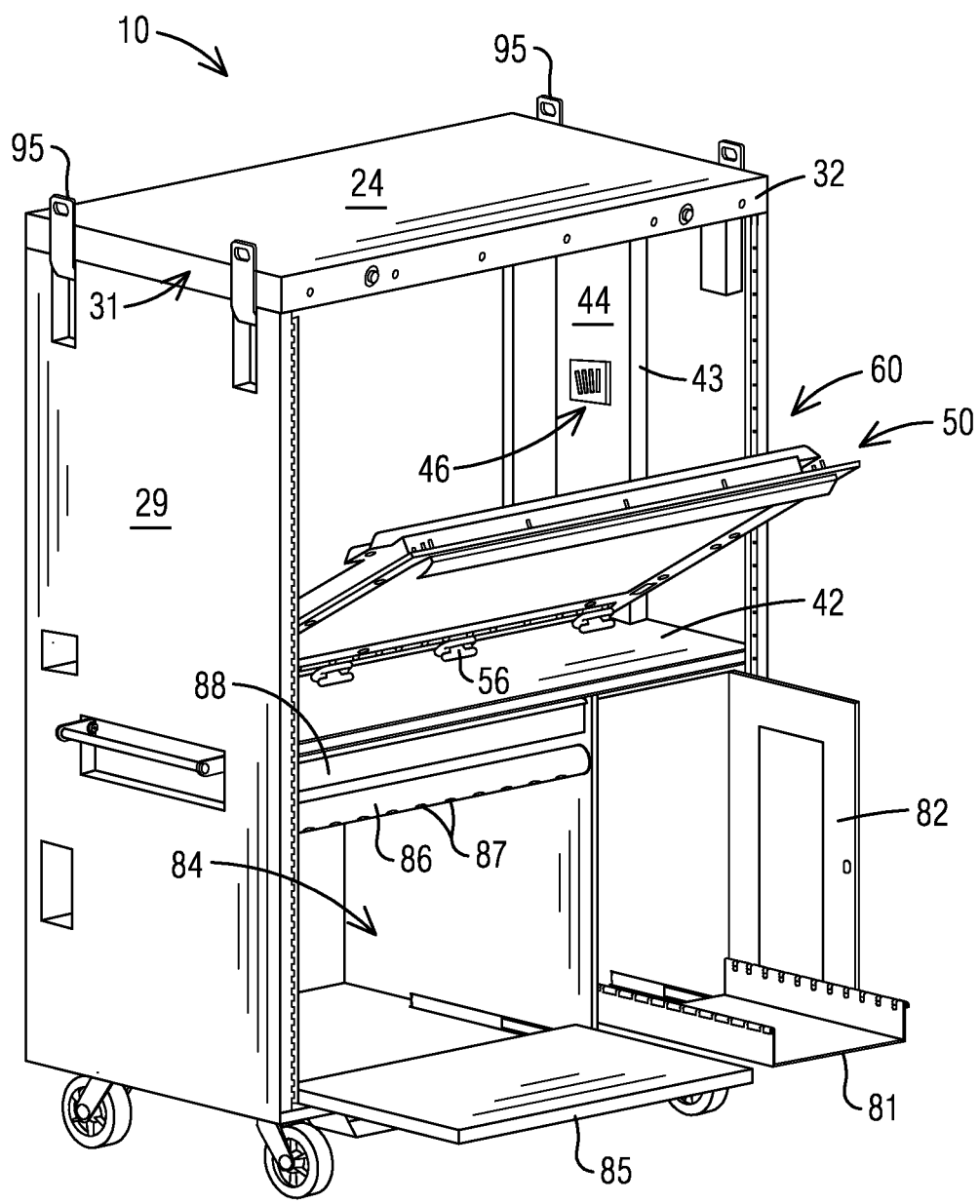
FIG. 5 is another perspective view of the field access station of FIG. 1 in an open configuration without the doors, and with a monitor panel assembly in a partially-lowered position.
Figure 6:
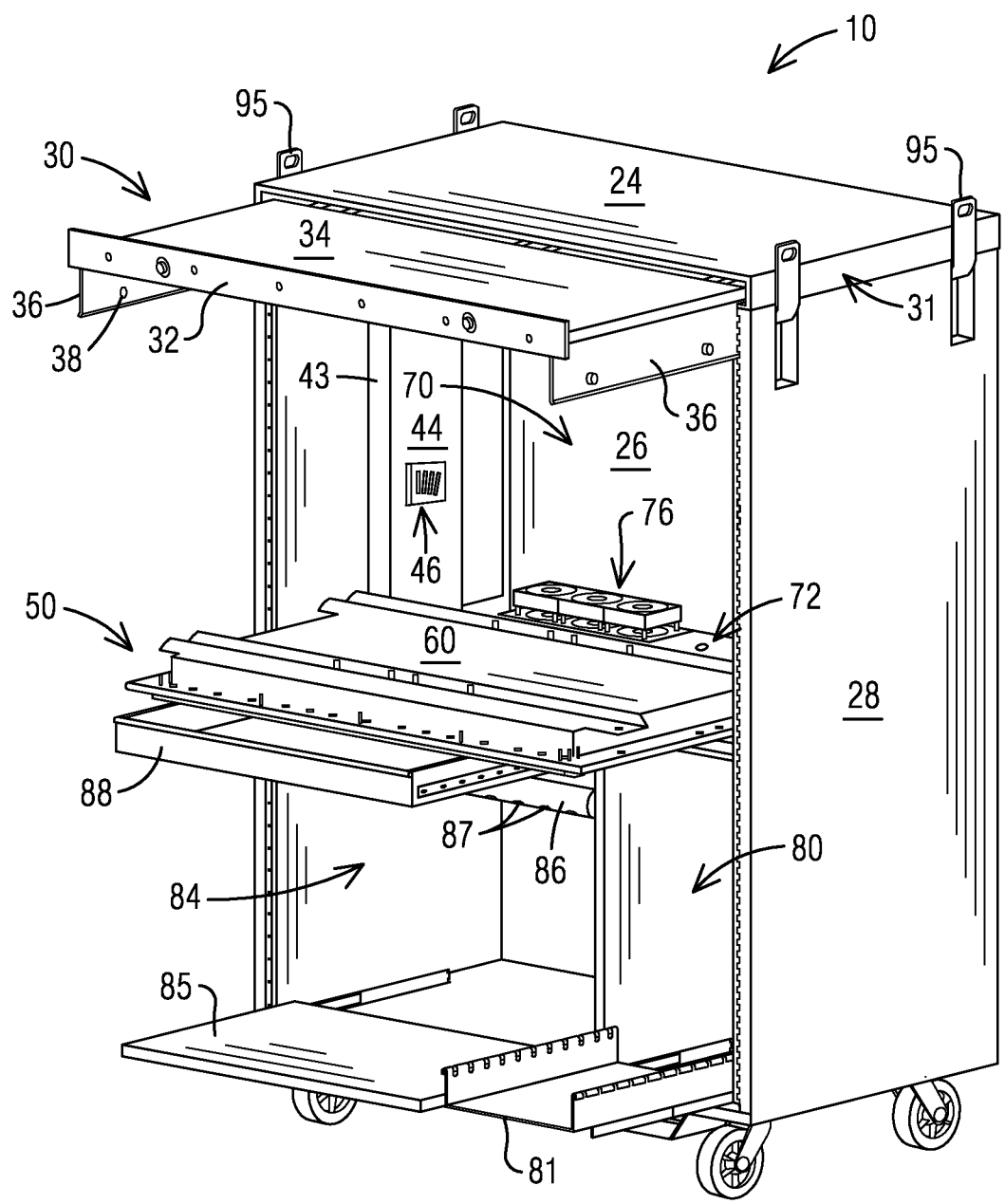
FIG. 6 is another perspective view of the field access station of FIG. 1 in an open configuration without the doors, and with the monitor panel assembly in a lowered position.

With specific reference to FIGS. 3 and 5-6, the upper monitor compartment 40 of the field access station 10 is generally configured to receive one or more television display monitors 60 that are mounted behind the transparent window 58 of the rotatable monitor panel assembly 50. The lower edge of the monitor panel assembly 50 may be pivotably coupled to the mid-table 42 of the enclosure 20 with hinges 56 that allow the monitor panel assembly 50 to rotate between an upright, in-use position (FIG. 3) and a lowered, rear-access position (FIG. 6). In one aspect the television display monitor 60 can be a single flat panel television having a diagonal dimension up to, for example, about fifty inches for a standard-sized enclosure 20, with larger monitors being possible with larger enclosures. In other aspects the field access station can include two flat panel televisions in a side-by-side relationship, with both flat panel televisions having a diagonal dimension up to, for example, about twenty-four inches. The transparent window 58 can also be provided with an opaque mat on an inside surface that can be cut and removed to form openings sized to uncover the active screen of the display monitor 60 while covering the outer edges or frame of the display monitor. A gasket made from foam or similar compliant material can also be mounted around the bezel of the one or more monitors to seal out any dust or debris from being statically drawn toward the active screen, and thus becoming trapped in the viewing area between the transparent window 58 and the screen of the monitor 60.

As shown in the illustrated embodiment, the upper monitor compartment 40 can also include an inverted U-shaped support frame 43 that is defined by side channels attached to the interior surfaces of the side panels 28, 29, and an upper channel attached to the underside of the awning box 31. The monitor panel assembly 50 can substantially fill the width and height of the opening defined by the support frame 43 so that the top edge and side edges of the monitor panel assembly 50 can be sealed against the underside surface 45 and side surfaces 44 of the support frame 43, respectively, while the bottom edge can be sealed against top surface of the mid-table 42. In addition, the monitor panel assembly 50 may be angularly positionable in two or more angled upright positions to create an optimum or preferred view angle, such as defined by a plurality of positioning slots 46 formed in the side surfaces 44 of the support frame 43. The monitor panel assembly 50 and the inside surfaces of the support frame 43 and mid-table 42 can also be configured to establish and maintain the edge seals around the perimeter of the monitor panel assembly 50 for all of its available upright positions. In this way the monitor panel 50 can be angularly adjustable between a plurality of angled upright positions to avoid glare on the transparent pane and provide a comfortable view angle for a user while maintaining the positive pressure within the back chamber.

The mid-table 42 of the enclosure 20 can be fixed at a convenient height for working while standing such as, for example, between about 32 inches and about 40 inches above a ground surface. In such a configuration, the screen of the display monitor 60 is also fixed at a height that is easily viewable by a group of individuals standing around the field access station 10, with the keyboard, mouse, laptop and other electronic devices supported on the mid-table 42 or within the extendable work drawer 88 also being easily accessible.

Figure 7:
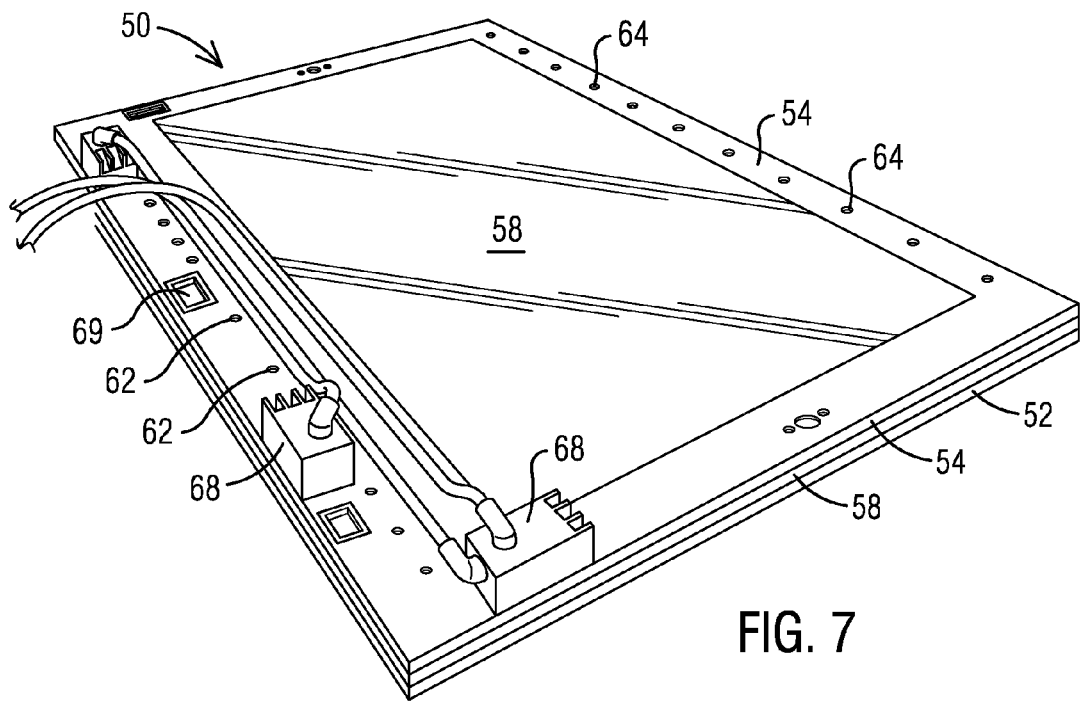
FIG. 7 is a perspective backside view of the isolated monitor panel assembly prior to mounting a large format electronic television monitor.

FIG. 7 is backside view of the isolated monitor panel assembly 50 of the field access station 10 during assembly. The monitor panel assembly generally comprises a transparent window pane 58 sandwiched between a front perimeter frame panel 52 and a back perimeter frame panel 54. In one aspect the window pane 58 can comprise scratch-resistant polycarbonate material or similar transparent material covered with a scratch-resistant coating, and can have a thickness greater than or about ½ inch. The front and back perimeter frame panels can be aluminum or steel alloy material. The lower vent holes 62, the upper vent holes 64, and the apertures for the various power outlets 68 and ports 69 for communication wiring can be formed through both the front and back frame panels 52, 54 and the window pane 58.

Figure 8:
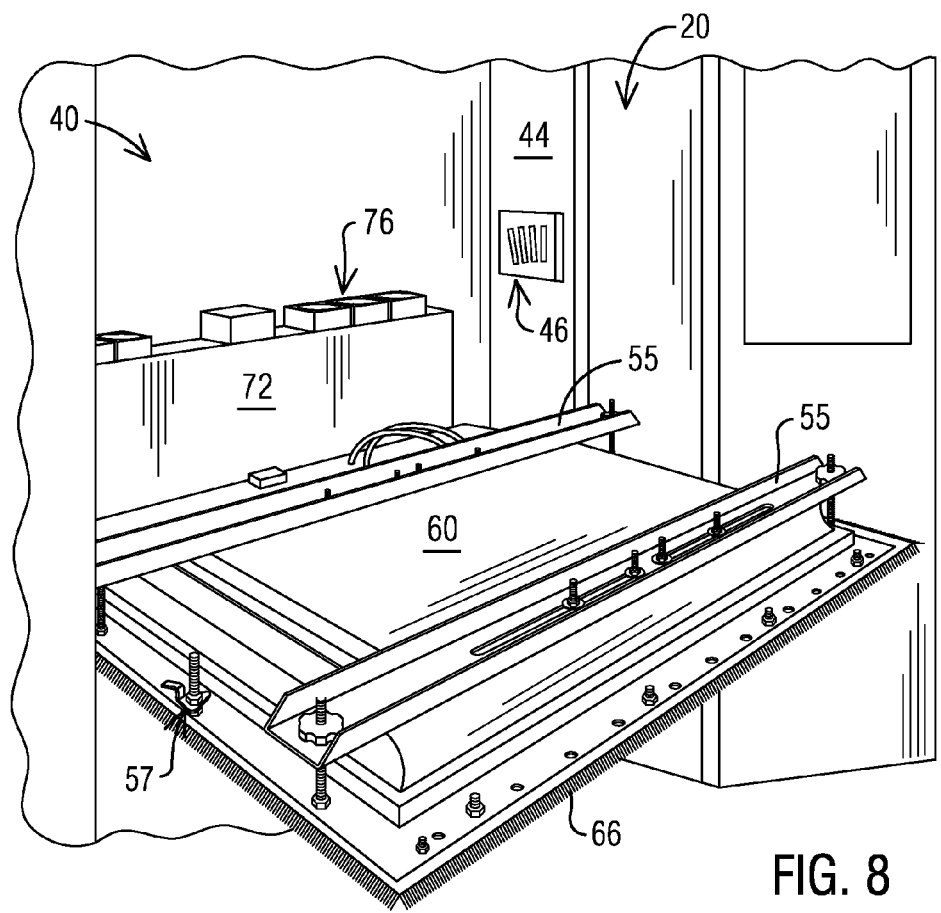
FIG. 8 is perspective view of the installed monitor panel assembly and monitor in a lowered position within the field access station.

FIG. 8 is backside view of the monitor panel assembly 50 after a television monitor 60 has been mounted to the back frame panel 54 with a universal mount bracket 55, and installation of the assembled monitor panel assembly 50 into the enclosure 20 in the lowered, rear-access position of FIG. 6. The edge seals 66 that seal the gaps between the inside surfaces 44 of the monitor compartment 40 and the perimeter edges of the monitor panel assembly 50 are also visible. In addition, a pair of latches 57 can be mounted to the side edges of the monitor panel assembly 50, with each latch 57 including a rotatable tab that is securable within one of the positioning slots 46 formed in the vertical side surfaces 44 of the support frame that allow the monitor panel assembly 50 to be positioned at an optimal viewing angle when the assembly is rotated upward to an upright position, as shown in FIG. 9.

Figure 9:
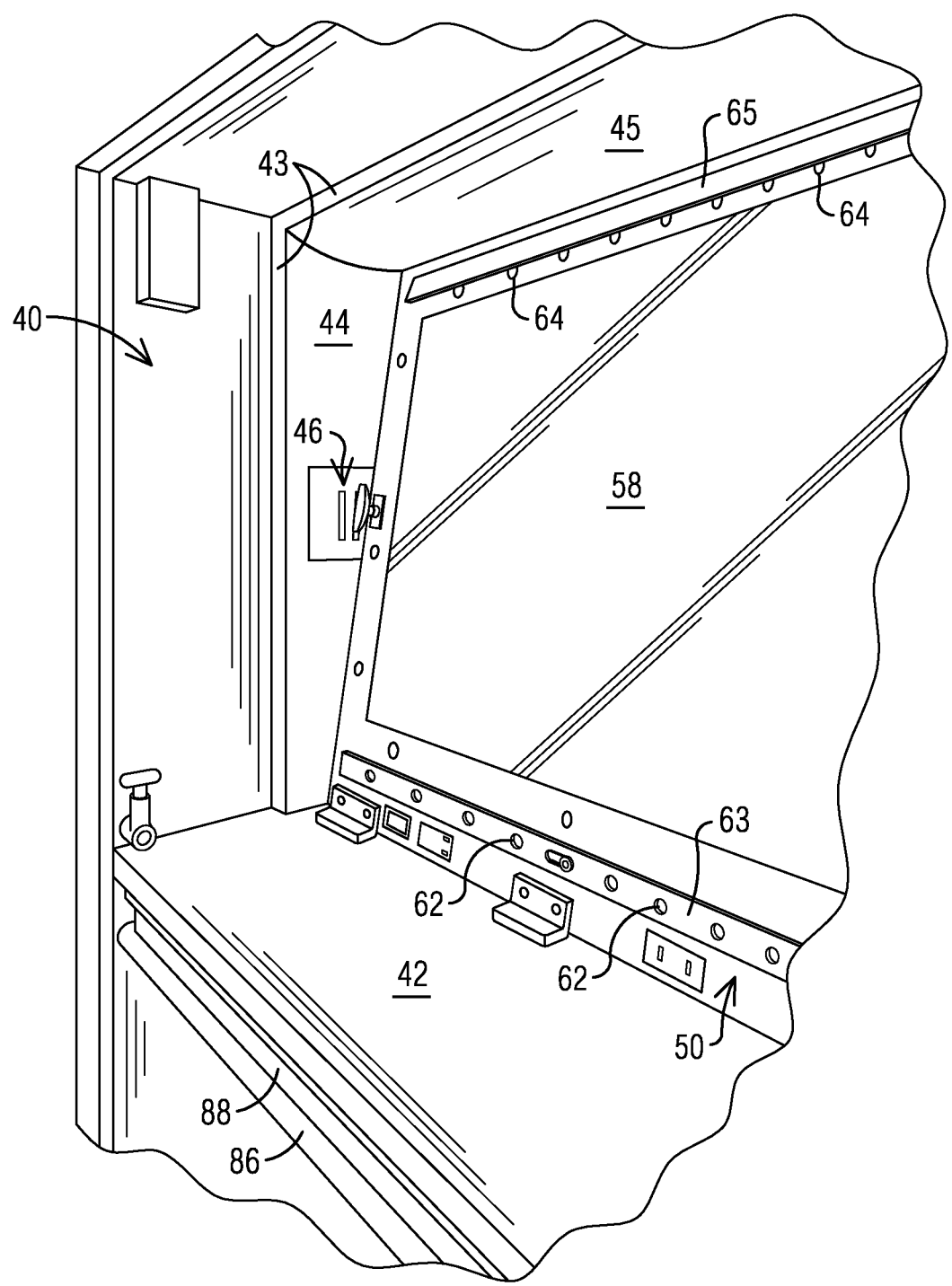
FIG. 9 is perspective view of the installed monitor panel assembly in an upright and inclined position within the field access station.

Also shown in FIG. 9 is the underside surface 45 of the support frame 43 that can be shaped or curved to maintain a substantially constant gap between the underside surface and the top edge of the monitor panel assembly 50 for each of the available angular positions of the display monitor. Also visible are the lower vent holes 62 configured to direct the filtered purge air exiting the back chamber to pass over the mid-table 42 and the extendable work drawer 88, and the upper vent holes 64 and air deflector 65 that is configured to direct the purge air to flow downwardly over the front surface of the window 58. The air diffuser 63 can be laterally slidable to partially or completely cover the lower vent holes 62 and adjust the flow of purge air, as desired.

Figure 10:
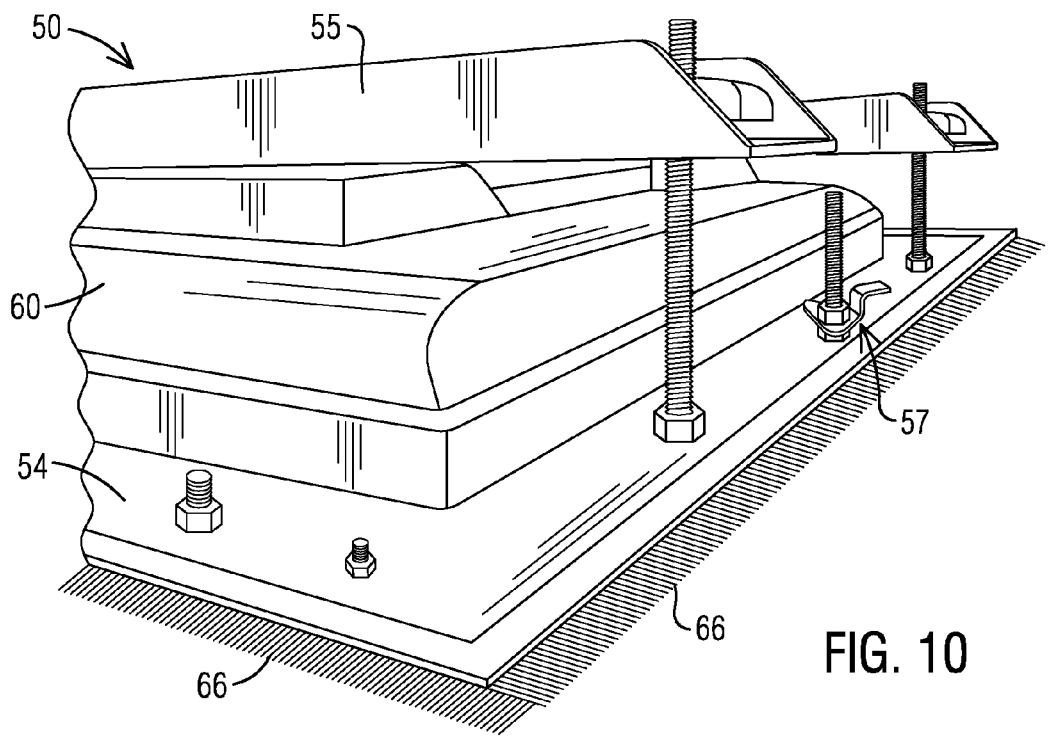
FIG. 10 is close-up view of an edge seal on the monitor panel assembly.

FIG. 10 is close-up view of the edge seal 66 on the monitor panel assembly 50, which in one aspect can comprise a flexible bristle brush. When flexed and compacted against the inside surfaces 44, 45 of the support frame 43 (FIG. 9), the closely-spaced bristles can be partially sealed or restrictive, or permeable, to allow a minority portion of the pressurized purge air to exit the back chamber by flowing outwardly through the bristles and around the perimeter of the monitor panel assembly 50 while preventing the inward passage of dust and water droplets and maintaining a positive pressure within the back chamber portion 70 of the upper monitor compartment 40. However, it is understood that a majority portion of the pressurized purge air will continue to exit the pressurized back chamber portion 70 through either the lower vent holes 62, the upper vent holes 64, or into and through the lower computer compartment 80, as discussed below.

Figure 11:
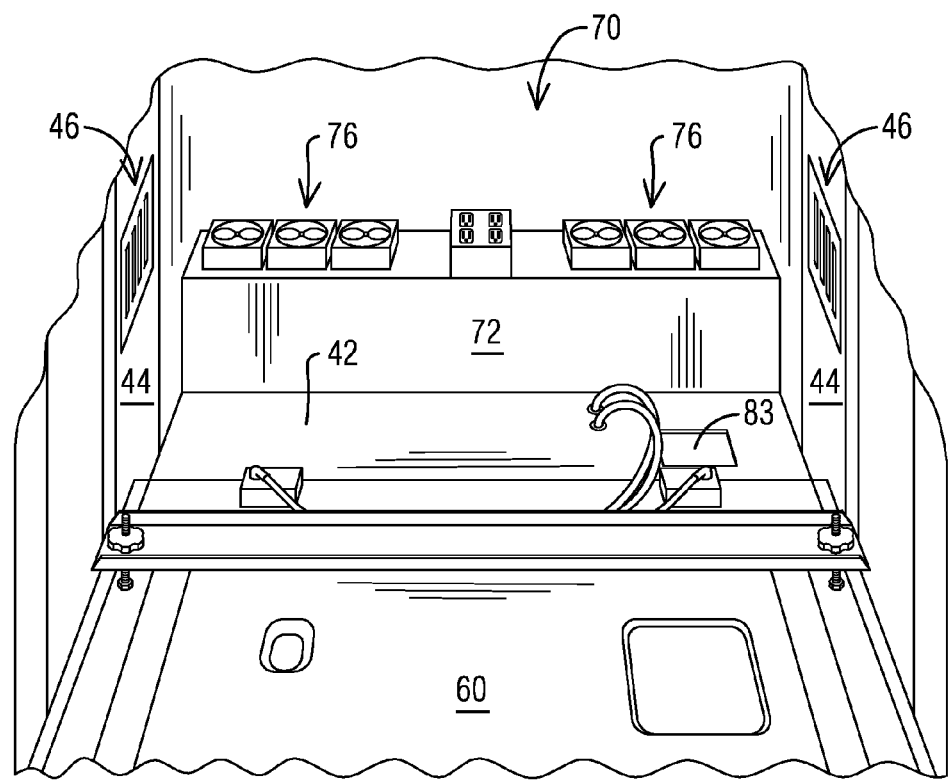
FIG. 11 is a front view of the interior of the upper monitor compartment of the field access station.
Figure 12:
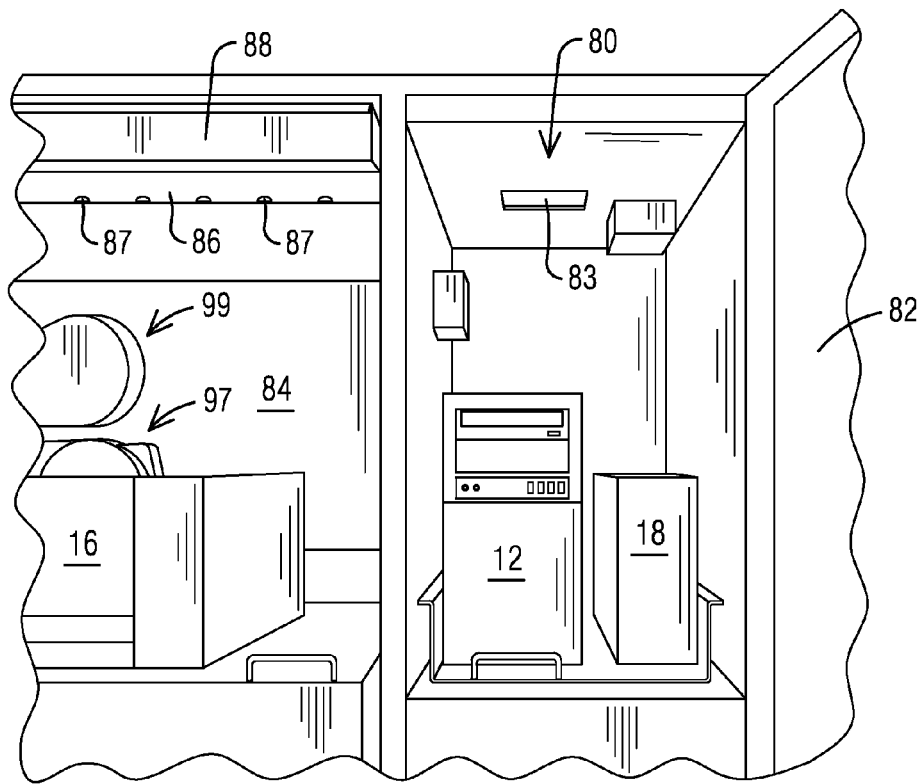
FIG. 12 is a front view of the lower computer compartment of the field access station with a computer and an uninterruptable power supply (UPS) installed therein.
Figure 13:
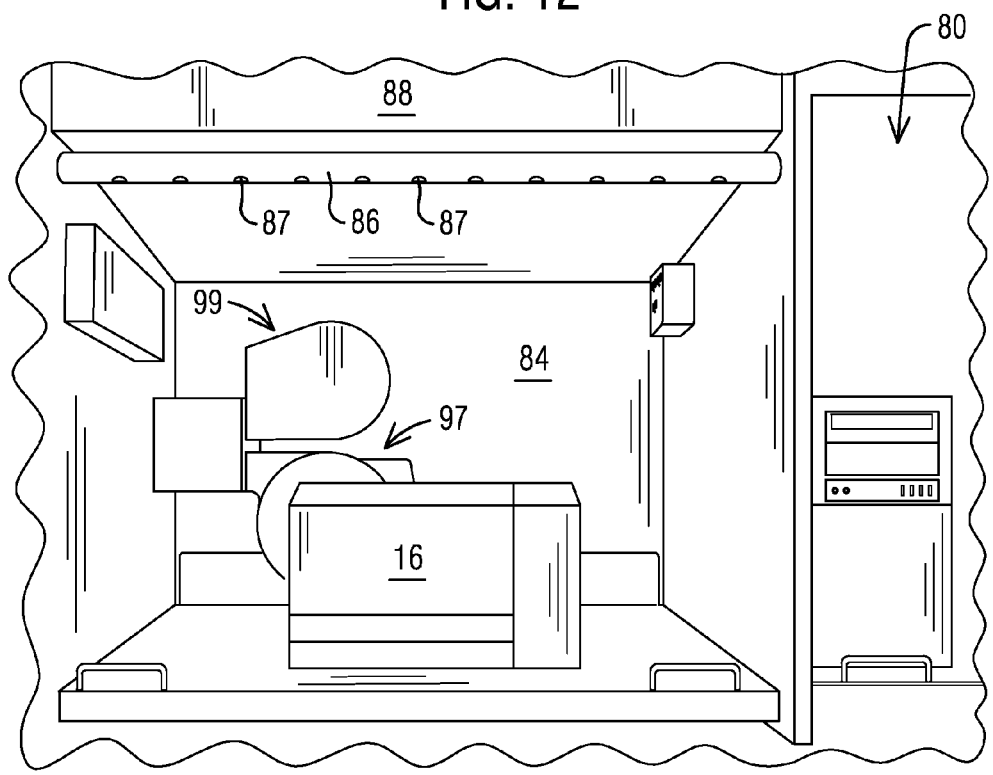
FIG. 13 is a front view of the lower printer compartment of the field access station with a printer installed therein.

This path of the purge air throughout the interior of the enclosure 20 is shown in more detail in FIGS. 11-13. As indicated above, the purge air can be drawn into the back chamber portion 70 of the field access system 10 through an the intake vent 74 and air filter 75 located in the back panel 26 of the enclosure (FIG. 4). The purge air can be forceably drawn into the enclosure 20 by one or more banks of fans 76 mounted on the top of an intake plenum 72 located within the back chamber portion 70 behind the monitor panel assembly 50 (FIG. 11). A portion of the pressurized purge air can then pass through a aperture 83 formed through the mid-table 142 and into the lower computer compartment 80 (FIG. 12), which can also be closed and at least partially sealed with a door 82. If desired, a one or more fans (not shown) can also be installed in the aperture 83 forceably draw the filtered purge air from the back chamber portion 70 down into the lower computer compartment 80. After passing around any electronic components stored within the computer compartment 80, such as a computer 12 or UPS 18, the purge air can then enter purge tube 86 and exit downwardly through vent holes 87 to form an air curtain across the front opening of the printer compartment 84 (FIG. 13) that helps to block particulate matter from entering the compartment 84 and settling on the printer 16. Also shown in FIG. 13 are the housings for a retractable power cord 97 and a retractable locking cable 99.

With the back chamber 70 of the enclosure 20 being at least partially sealed except for the lower vent holes 62 and the upper vent holes 64 in the monitor panel assembly 50, and with the computer compartment 80 also being at least partially sealed except for the purge tube 86 and vent holes 87, an air circulation pattern can be established within the pressurized portions of the enclosure 20 that both cools the electronic components secured within the enclosure and provides for a steady, directed flows of air through the vent holes 62, 64, 87 and over the top of the exposed electronic devices that are supported outside of the pressurized portions. As discussed above, these directed flows of air outside of the pressurized portions of the enclosure 20 can operate to both cool the external devices and to divert any dust or other particulate matter from falling on their exposed surfaces.

Figure 14:
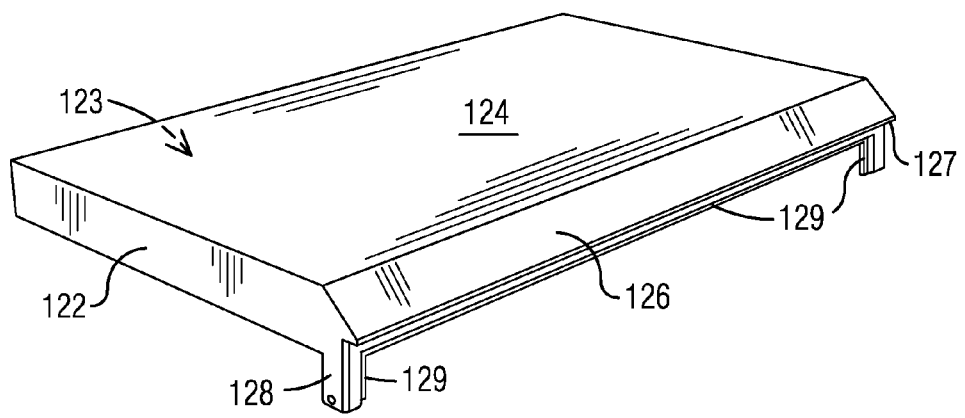
FIG. 14 is a front perspective view of a roof cap of the field access station, in accordance with another representative embodiment.
Figure 15:
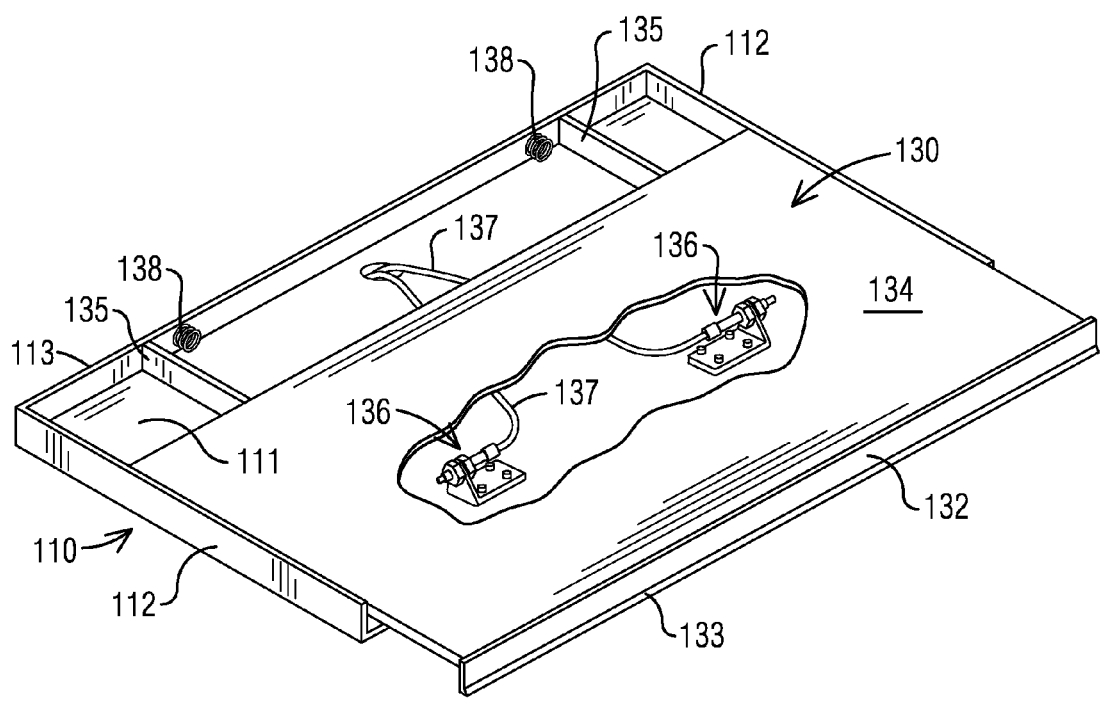
FIG. 15 is a front perspective view of an awning and awning box of the field access station that interfaces with the roof cap of FIG. 14.

In another embodiment of the movable field access station shown in FIGS. 14-15, the roof cap 120 that overlies and covers the awning box 110 can include a top panel 124 with vertical side edge panels 122 and a vertical back edge panel 123 that are secured to the sides 112 and back 113 of the awning box 110 to define an awning compartment. In turn, the awning box 110 can be welded or otherwise secured to the top edges of the side and back panels of the main enclosure (not shown). The roof cap 120 can also include a front edge panel 126 that angles downwardly and forwardly from the top panel 124 to form an overhang 127 that is sized to receive the top edge of the awning door or fascia 132 when the awning 130 is retracted into the awning compartment. In this way any water that runs down over the front edge of the roof cap 120 when the field access station is in a closed configuration will be prevented from flowing down the backside of the facia 132 and onto the front portion of the awning tray 134. Instead, the water will flow down the front edge panel 126 and over the front face of the fascia until it is directed away from the enclosure by a drip edge 133 extending along the bottom of the fascia.

In one aspect, the roof cap 120 may also include downwardly-extending front pedestals 128 that fit over the front edges of the sides 112 of the awning box 110 to provide a seamless interface between the roof cap 120 and the awning box 110 around the upper half of the opening to the awning compartment. The inside edges of the front pedestals 128 and the underside of the front edge panel 126 can also include connection or attachment means for a three-sided weather seal 129, such as a three-sided rubber gasket sweep, that provides a continuous and flexible contact seal across the top face and side edges of the awning tray 134. If water is present on the top surface of the awning tray 134 when the awning 130 moved from its open, extended position to its closed and retracted position inside the awning compartment, the three-sided weather seal 129 can sweep the water off the top and sides of the awning tray 134 and away from the enclosure, to reduce the amount of moisture that could otherwise be carried into the awning compartment.

Figure 16:
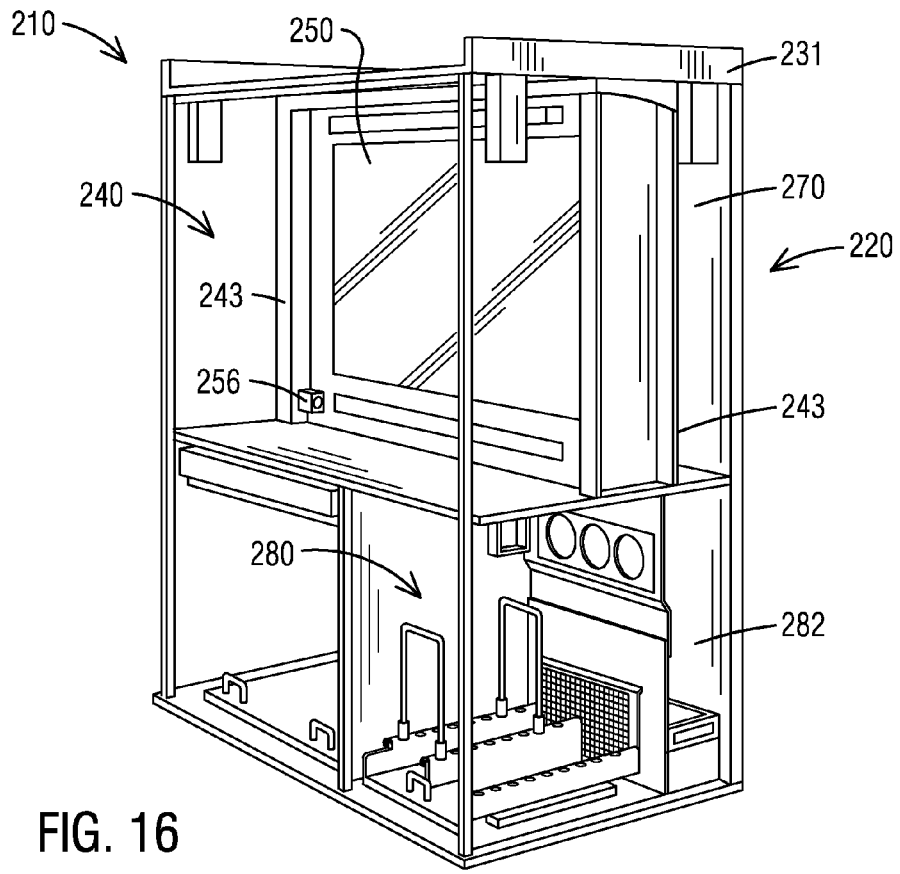
FIG. 16 is a front side perspective view of the partially-assembled field access station, in accordance with another representative embodiment.

As disclosed above, the awning 130 can be mounted on slide channels 135 having linear bearings that allow the awning 130 to easily slide or roll into and out of the awning compartment. In one aspect, spring-loaded pin latches 136 can also be mounted within the front portion of the awning compartment and configured to engage with strike plates (not shown) secured to the underside of the awning tray 134 and lock the awning tray 134 in a particular position. For example, one set of rear strike plates can be attached to the underside of the awning tray 134 proximate its back edge and configured to engage and become locked by the pin latches in the fully open and extended position. And another set of forward strike plates can be attached to the underside of the awning tray 134 proximate the its front edge and configured to engage and become locked by the pin latches in the fully closed and retracted position. One or more spring devices 138 can also be mounted to either the back 113 of the awning box 110 or to the back edge of the awning tray 143 and configured to compress as the awning 130 is pushed into its closed position, prior to becoming engaged and locked into place by the pin latches. The compressed spring devices 128 can then cause the awning 130 to pop open when the pin latches 136 are activated to disengage their pins from the forward strike plates. In addition, activation cables 137 for the pin latches 136 can extend down through an aperture in the awning box to an activation handle located on the front of the monitor panel assembly (FIG. 16). This arrangement of components within the awning compartment can advantageously remove the need for a handle on the fascia 132 for extending and closing the awning 130, as well as the need for exterior locks to secure the awning in its retracted, tamper-proof position when the field access station is closed and locked to form a sealed and substantially weather-proof enclosure.

FIG. 16 is a front side perspective view of another embodiment of the field access station 210 in a partially-assembled state, particularly without the roof cap, awning, front doors, and side panels of the enclosure 220. In this embodiment the intake plenum 282 has been moved from the back chamber portion 270 of the upper monitor compartment 240 to the lower computer compartment 280, which allows the monitor panel assembly 250 and the support frame 243 to be moved deeper into the upper monitor compartment 240, reducing the size of the back chamber portion 270 while expanding the usable work space on mid-table 242 and the sheltered volume in front of the monitor panel assembly 250.

Figure 17:
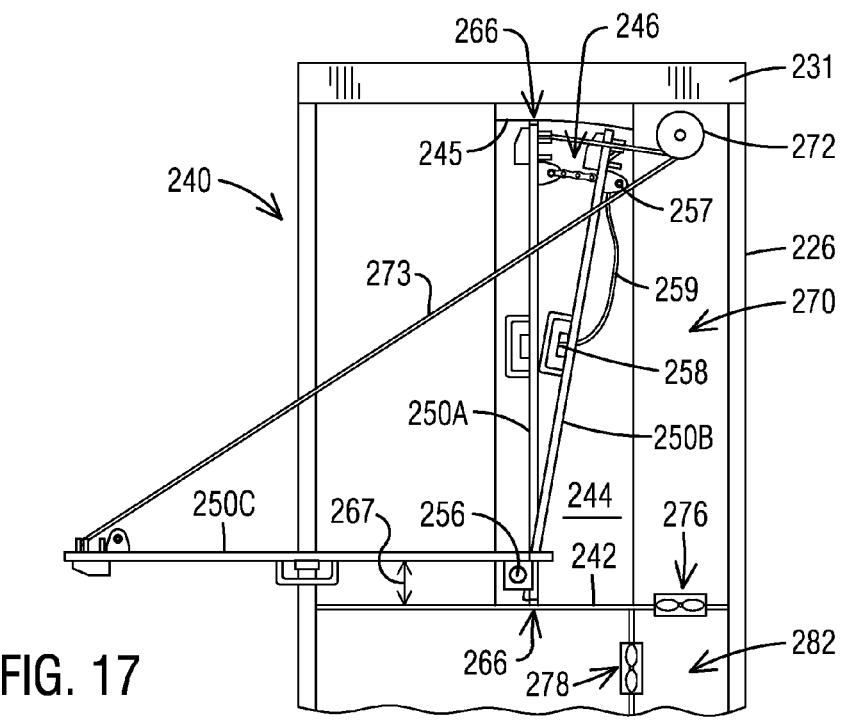
FIG. 17 is a close-up cross-sectional side view of the upper monitor compartment of the partially-assembled field access station of FIG. 16.

As shown in FIG. 17, the monitor panel assembly 250 (shown in three representative positions 250A, 250B, 250C and without a television monitor) can be pivotably supported on bushings 256 that are positioned two to four inches above the mid-table 242. When the monitor panel assembly is in an upright, in-use position (250A, 250B), spring-loaded pin latches 257 mounted on the sides of the monitor panel assembly near its upper edge can be engaged within detent holes 246 formed into the vertical inside surfaces 244 of the support frame 243. The pin latches 257 can be connected with cables 259 to a T-handles 258 extending outward from the front face of the monitor panel assembly so that a user need only to grasp and pull on the T-handles 258 to retract the pins and allow the angular adjustment of the monitor panel assembly through a variety of angles that can range from vertical 250A to ten degrees or more past vertical 250B (i.e. toward the back panel 226 of the enclosure 220). In one aspect the series of detent holes 246 can also extend forwardly so that monitor panel assembly can be oriented at an angle that is less-than-vertical, so as to provide a more direct view angle for a user sitting down and working on the mid-table 242. The T-handles 258 can also be covered by protective U-shaped palm brackets that allow a user to pull on the T-handles with two fingers while controlling the angular position of the monitor panel assembly with the rest of the fingers and the palm of the hand. In this way the monitor panel assembly 250 can be angularly adjustable between a plurality of angled upright positions to avoid glare on the transparent pane and provide a comfortable view angle for a user.

Retracting the pin latches 257 can also allow the monitor panel assembly to rotate downward to the fully-lowered, rear-access position 250C in which the monitor panel assembly is spaced above the mid-table 242 by a gap 267 that provides space for a keyboard, mouse, and other thin electronic items resting on the mid-table without interference from the hardware projected from the front face of the monitor panel assembly. As the monitor panel assembly with a secured large-format television monitor can be quite heavy, a torsion cable lift system 272 may be mounted with the upper end of the back chamber portion 270, with support cables 273 extending to the upper side edges of the monitor panel assembly. The torsion cable lift system 272 can be configured to maintain only a slight tension on the monitor panel assembly when upright to allow easy adjustment between the various angular positions 250A, 250B. The lift system 272 can then rapidly increase the tension on the cables 273 as the monitor panel assembly 250 is rotated forward and downward to its lowered rear-access position 250C to offset the weight of the monitor panel assembly. Upon reaching the lowered and substantially horizontal position, the monitor panel assembly can be fully-supported at its outer end by the cables 273 and at the inner end by the bushings 256 that are secured to the support frame 243.

Also visible in FIG. 17 is the top portion of the plenum 282 and the two banks of fans 276, 278 that draw filtered purge air into the enclosure. The upper bank of fans 276 can forceably draw the purge air up into the back chamber portion 270 of the upper monitor compartment 240 to pressurize the volume and prevent contaminated air from entering the compartment, and also to establish the circulation of cooling air around the backside of the television monitor prior to exiting through the upper and lower vent holes (FIG. 9) formed through thickness of the monitor panel assembly.

With the monitor panel assembly 250 being angularly adjustable to provide a range of viewing angles (for example, positions 250A, 250B) for users standing or sitting within the enclosure, the field access station can advantageously maintain an air seal between the perimeter edges of the monitor panel assembly and the interior surfaces of the upper monitor compartment 240 in any of the upright positions. For instance, and as discussed above, the monitor panel assembly can include an edge seal 266, such as a bristle brush, that flexes and compacts against the vertical side surfaces 244 and the shaped underside surface 245 of the support frame 243 and against the top surface of the mid-table 242. In its compacted state, the edge seal 266 can form a partial seal that allows a minority portion of the pressurized purge air to continuously exit the back chamber 170 by flowing outwardly through the bristles and around the perimeter of the monitor panel assembly 250, and thereby prevent the inward passage of dust and/or water droplets.

In order to sustain the at least partial seal along the top edge of the monitor panel assembly 250 in all upright angular positions, the underside surface 245 of the support frame 243 can be shaped or curved to match the arc of the top edge and thereby provide a substantially constant gap that maintains the compression on the edge seal 266 across the range of angular positions. A bristle brush edge seal 266 along the bottom edge of the monitor panel assembly may also sustain the seal along the bottom edge, even though the mid-table 242 may not be curved, because the arc of the bottom edge is much shorter than the arc of the top edge. However, it is contemplated that the edge seal 266 along the bottom edge can alternatively comprise a flexible membrane, such as a rubber sheet or gasket material, that bends to press against the top surface of the mid-table 242 to form a non-permeable seal in all upright angular positions.

Figure 18:
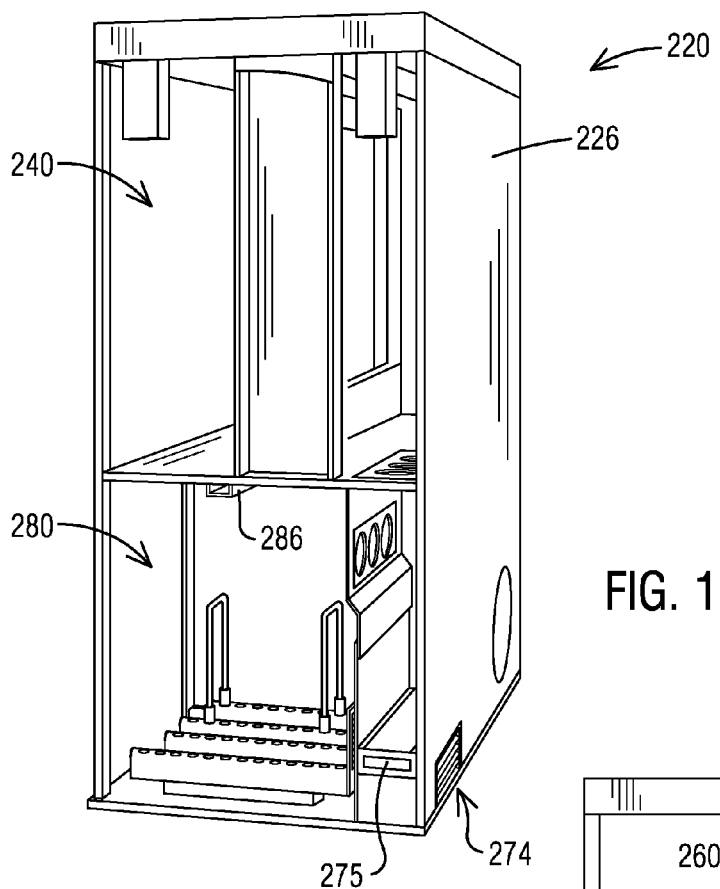
FIG. 18 is a back side perspective view of the partially-assembled field access station of FIG. 16.
Figure 19:
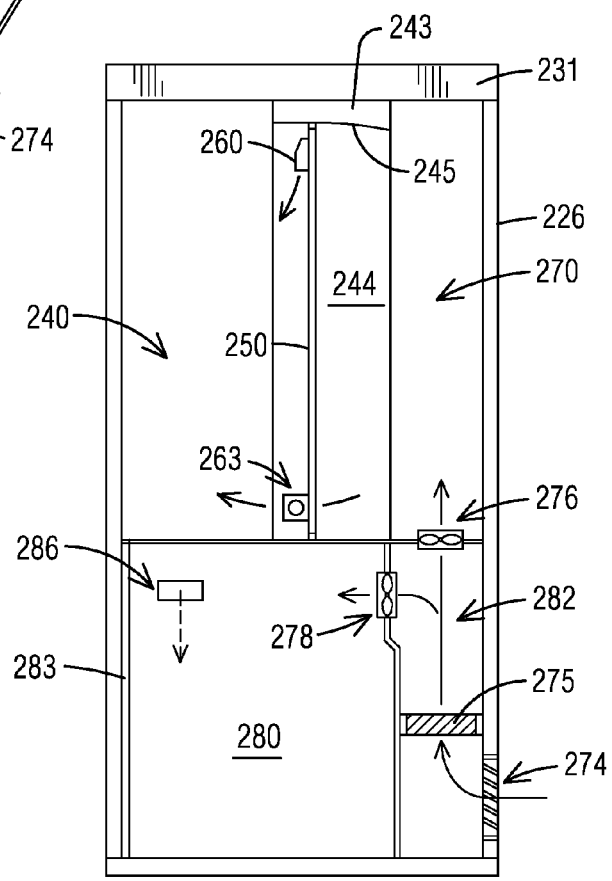
FIG. 19 is a cross-sectional side view of the partially-assembled field access station of FIG. 16.

The location of the air intake plenum 282, the air intake 274, and the air filter 275 in the back portion of the computer compartment 280 of field access station 210 are illustrated in further detail in FIGS. 18-19. In one aspect the air intake 274 can be located at the bottom of the plenum and in the lower corner of the back panel 274, and with an air filter 275 positioned to filter the air as it is drawn upward through the plenum by two separate banks of purge air fans 276, 278. If the moisture content of the air drawn into the plenum is high, the water vapor can condense on the filter element and drop back down into small volume below the filter where it can eventually evaporate or be drained away. The air filter 275 can also be configured for exterior access through the side panel of the enclosure for cleaning or replacement. The upper bank of fans 276 can then draw one stream of purge air up into the back chamber portion 270 of the upper monitor compartment 240, while the lower bank of fans 278 draws another stream of purge air directly into the lower computer compartment 280. After cooling the computer, UPS, and any other electronic components contained within the computer compartment 280, the second stream of purge air will exit either around the at least partially sealed perimeter edges of the computer door 283 or through the purge air tube 286 that extends across the upper portion of the printer compartment 284 (FIG. 16) and out through the vent holes 287, thereby forming the air curtain barrier that protects the printer from dust and other airborne particulates.

The invention has been described herein in terms of preferred embodiments and methodologies considered by the inventor to represent the best mode of carrying out the invention. It will be understood by the skilled artisan, however, that a wide range of additions, deletions, and modifications, both subtle and gross, may be made to the illustrated and exemplary embodiments without departing from the spirit and scope of the invention. For example, in some aspects the field access station can include a dehumidifier for withdrawing moisture from the purge air circulating throughout the enclosure, so as to reduce the potential for condensation on or within the electronic components, while in other aspects the field access station can include one or more heaters for heating the purge air circulating throughout the enclosure and warming the electronic components. In one aspect the heaters can be mounted to the fan units and controlled by thermostats. The field access station can also include an automatic cutoff switch which cuts off power to the purge air fans when the enclosure doors are closed.

These and other revisions might be made by those of skill in the art without departing from the spirit and scope of the invention that is constrained only by the following claims.

What is claimed is:

1. A system for displaying construction documents in electronic format in a high-dust industrial environment, the system comprising:

an enclosure including:
- a bottom panel, a back panel, side panels, and a top panel, each of the panels being coupled along sealed edges to its adjacent panels; and
- at least one door panel extending across an open side between the side panels and closable to define an interior volume that is substantially sealable against infusion of dust and water;
- a monitor panel assembly extending across the width of the interior volume between the side panels to define a back chamber between the monitor panel assembly and the back panel, the monitor panel assembly including at least one perimeter frame having a center aperture and a transparent pane extending across the center aperture for viewing an electronic display therethrough; and
- a purge air system in fluid communication with the back chamber and operable, when the at least one door panel is in an open configuration, to draw in and filter air from outside the enclosure and establish a positive air pressure within the back chamber,
- wherein the monitor panel assembly is angularly adjustable between a plurality of angled upright positions to avoid glare on the transparent pane and provide a comfortable view angle while maintaining the positive pressure within the back chamber.

2. The system of claim 1, wherein the at least one perimeter frame further comprises side edges with a side edge seal contacting interior side surfaces and a top edge with an top edge seal contacting an interior underside surface.

3. The system of claim 2, wherein the interior underside surface is curved to maintain a substantially constant gap across the top edge seal as the monitor panel assembly is rotated between upright positions.

4. The system of claim 2, wherein the side edge seal is permeable to allow an outflow of purge air through the side edge seal while maintaining the positive pressure within the back chamber.

5. The system of claim 2, wherein the top edge seal is permeable to allow an outflow of purge air through the top edge seal while maintaining the positive pressure within the back chamber.

6. The system of claim 1, further comprising an electronic display secured to the inside of the at least one perimeter frame and visible through the first aperture.

7. The system of claim 1, further comprising a mid-table extending across the width of the interior volume between the side panels to separate the interior volume into an upper monitor compartment including the monitor panel assembly above the mid-table and at least one pressurizable lower chamber below the mid-table.

8. The system of claim 7, further comprising having a plurality of outlet holes formed through the monitor panel assembly and configured to direct an outlet flow of filtered purge air over a front portion of the mid-table.

9. The system of claim 7, wherein the purge air system includes a plenum within the interior volume and adjacent the back panel, and having a lower end and an upper end, with the lower end being configured to receive purge air through an intake vent in the back panel and at least one fan at the upper end configured drawing purge air upwards through the plenum into the back chamber.

10. The system of claim 9, further comprising a purge air filter in the intake plenum proximate the intake vent.

11. The system of claim 10, wherein the purge air filter is accessible from through an opening in a side panel of the enclosure.

12. The system of claim 9, further comprising at least one additional fan spaced from the at least one fan at the upper end of the plenum and configured to draw purge air into the lower chamber.

13. The system of claim 1, further comprising an awning assembly mounted in an awning compartment above the top panel and being forwardly extendable to cover the open side of the enclosure when the at least one door panel is in an open configuration.

14. The system of claim 13, wherein the at least one door panel further comprises a pair of front doors pivotably secured to the side panels with continuous hinges.

15. The system of claim 14, wherein the awning assembly includes an awning tray and a pair of catch flaps pivotably secured to the side edges of the awning tray and configured to drop down to cover gaps between the awning tray and the top edges of the front doors.

16. The system of claim 13, wherein the awning assembly is released from a closed and locked position with the awning compartment through activation of a release handle located within the interior volume.

17. The system of claim 1, wherein the enclosure is supported on a plurality of pivoting rollers extending downward from the bottom panel and adapted for rolling across a floor surface.

18. The system of claim 1, further comprising a plurality of lifting lugs proximate the top panel and adapted to carry the enclosure when attached to an overhead lift system.

19. A system for displaying construction documents in electronic format, the system comprising:
- a compartment defined by an enclosure substantially sealable against infusion of dust and water, and defining a monitor opening;
- a monitor panel assembly positioned within the monitor opening to define a back chamber between the monitor panel assembly and interior portions of the compartment, the monitor panel assembly including at least one perimeter frame having a center aperture and a transparent pane extending across the center aperture for viewing an electronic display therethrough; and
- a purge air system in fluid communication with the back chamber and operable to draw in and filter air from outside the enclosure and establish a positive air pressure within the back chamber,
- wherein the monitor panel assembly is angularly adjustable between a plurality of angled upright positions while maintaining the positive pressure within the back chamber.

20. A system for displaying construction documents in electronic format in a high-dust industrial environment, the system comprising:
- a upright enclosure having a height, a width that is less than the height, a depth that is less than the width, a front opening, and at least one door extendable across the front opening to define an interior volume that is substantially sealable against infusion of dust and water;
- a mid-table extending across of the width and depth of the enclosure to divide the interior volume into an upper monitor compartment above the mid-table and at least one pressurizable lower chamber below the mid-table;
- a monitor panel assembly extending across the width of the upper monitor compartment to define a pressurizable back chamber between the monitor panel assembly and a back of the enclosure, the monitor panel assembly including at least one perimeter frame having a center aperture and a transparent pane extending across the center aperture for viewing an electronic display therethrough;

a plenum within the interior volume and configured to receive and filter purge air from outside the enclosure through an intake vent;

at least one fan at an upper end of the plenum and configured draw filtered purge air through the plenum into the back chamber and establish a positive air pressure within the back chamber; and at least one additional fan spaced from the at least one fan at the upper end of the plenum and configured to draw the filtered purge air into the lower chamber and establish a positive air pressure within the lower chamber.

21. A system for displaying construction documents in electronic format in a high-dust industrial environment, the system comprising:

a upright enclosure having a height, a width that is less than the height, a depth that is less than the width, a front opening, and a pair of front doors pivotably secured to the enclosure with continuous hinges and operable to seal the front opening to define an interior volume that is substantially sealable against infusion of dust and water;

a mid-table extending across of the width and depth of the enclosure to divide the interior volume into an upper monitor compartment above the mid-table and at least one lower chamber below the mid-table;

a monitor panel assembly extending across the width of the upper monitor compartment to define a pressurizable back chamber between the monitor panel assembly and a back of the enclosure, the monitor panel assembly including at least one perimeter frame having a center aperture and a transparent pane extending across the center aperture for viewing an electronic display therethrough;

a purge air system in fluid communication with the back chamber and operable, when the pair of front doors are in an open configuration, to draw in and filter air from outside the enclosure and establish a positive air pressure within the back chamber; and an awning assembly mounted in an awning compartment above a top of the enclosure and being forwardly extendable to cover the front opening of the enclosure, wherein the awning assembly includes an awning tray and a pair of catch flaps pivotably secured to the side edges of the awning tray and configured to drop down to cover gaps between the awning tray and the top edges of the front doors when the front doors are in an open configuration.

\* \* \* \* \*